United States Patent
Oehm

[11] Patent Number: 5,897,135
[45] Date of Patent: Apr. 27, 1999

[54] OCCUPANT PROTECTION DEVICE FOR A MOTOR VEHICLE

[75] Inventor: Klaus Oehm, Gifhorn, Germany

[73] Assignee: Volkswagen AG, Wolfsburg, Germany

[21] Appl. No.: 08/883,690

[22] Filed: Jun. 27, 1997

[30] Foreign Application Priority Data

Jun. 27, 1996 [DE] Germany .......................... 196 25 791

[51] Int. Cl.$^6$ .................................................. B60R 21/20
[52] U.S. Cl. ........................................ 280/728.3; 280/732
[58] Field of Search ............................. 280/728.3, 732, 280/735

[56] References Cited

U.S. PATENT DOCUMENTS

| | | | |
|---|---|---|---|
| 3,632,136 | 1/1972 | Foltz | 280/732 |
| 4,773,673 | 9/1988 | Sakurai | 280/728.3 |
| 5,080,393 | 1/1992 | Dixon et al. | 280/728.3 |
| 5,217,244 | 6/1993 | Bauer | 280/732 |

*Primary Examiner*—Paul N. Dickson
*Attorney, Agent, or Firm*—Cohen, Pontani, Lieberman & Pavane

[57] ABSTRACT

An occupant protection device for a motor vehicle having at least one inflatable airbag which, upon activation leaves through an exit opening, normally closed by a panel or cover, into the interior of the motor vehicle, and having a mechanism, independent of the airbag, for removing the panel or cover. In order to permit immediate activation of the airbag without a time delay and unhindered exiting of the same from the exit opening when an associated sensor or an associated sensor system responds in the event of an accident, the mechanism for removing the panel or cover can be activated separately from the airbag and before the response of the sensor or sensor system effecting the activation of the airbag.

18 Claims, 3 Drawing Sheets

OCCUPANT PROTECTION DEVICE FOR A MOTOR VEHICLE

BACKGROUND OF THE INVENTION

1. Field of the Invention

The invention relates to an occupant protection device for a motor vehicle having at least one inflatable airbag, which upon activation leaves through an exit opening, normally closed by a panel or cover, into the interior of the motor vehicle. The device includes means independent of the airbag for removing the panel or cover.

2. Description of the Prior Art

In the case of the known occupant protection devices having inflatable front or side airbags for motor vehicles, the exit opening through which, in the event of a collision, the airbag leaves in the direction of the interior of the motor vehicle is generally closed by a panel or cover for safety reasons and because of outer appearance. The panel or cover is usually formed by part of an internal paneling of the motor vehicle, a steering wheel covering or a cover part of an airbag housing and is generally detachably fastened in such a way that, when the airbag inflates, it can be opened explosively or by impact of the airbag in order to clear the exit opening. In this case, the panel or cover is usually accelerated in the direction of the interior of the motor vehicle, so that the risk of injuries to the vehicle occupants being caused by the moving panel or cover cannot be ruled out.

To solve this problem, in German reference DE-A 42 17 174 there is proposed an occupant protection device of the previously mentioned type in which the airbag is arranged in a pivotable housing open on one side. The exit opening of the housing is normally closed by a part of the housing designed as a foam padding. In the event of an accident, the housing part is pivoted, before inflation of the airbag, with the aid of a pyrotechnic propellant charge, in order to remove the foam padding from the region of the exit opening and at the same time pivot an open exit side of the housing in front of the exit opening arranged in an instrument panel of the motor vehicle. In the case of the known occupant protection device, in the event of an accident, first of all the pyrotechnic propellant charge is automatically ignited by acceleration sensors or the like which then respond and, as a result, the housing is pivoted, so that its open exit side comes to lie in front of the exit opening and the airbag then automatically inflated by an associated gas generator is able to leave from the exit opening. Although this sequence of events which proceed automatically in the event of an accident can eliminate the possibility of occupants being endangered by the panel or cover, the period of time between the response of the acceleration sensor and the beginning of the inflation of the airbag is extended by decisive fractions of a second, which cannot be tolerated because of the brevity of the time period available, in particular in the case of side airbags. The reason for the time delay is the necessary acceleration of the housing and the time required for covering the pivoting path, during which it is necessary to wait since, in the case of the known occupant protection device, the ignition of the airbag gas generator may take place only when the open exit side of the housing is completely in line with the exit opening, because otherwise catching or tearing open of the airbag cannot be ruled out.

Occupant protection devices for motor vehicles which include sensors designed as proximity sensors, which respond even before the motor vehicle collides with another object, are already known per se, for example from German references DT 20 49 183 and DE 44 24 878 A1. These sensors usually comprise a transmitter and a receiver which measures the radiation emitted by the transmitter and reflected by an obstacle and determines from this the distance from the other object. However, the sensors of these known occupant protection devices always effect an activation of the airbag and do not serve for the removal of a panel or cover which closes an exit opening for the airbag.

Furthermore, an occupant protection device which, in addition to an impact sensor, comprises an additional proximity sensor is known from U.S. Pat. No. 3,684,309. In this case the proximity sensor effects the activation of the airbag, while the impact sensor serves the purpose of controlling the inflation of the airbag according to the force of impact.

SUMMARY OF THE INVENTION

On this basis, the object of the present invention is to improve an occupant protection device of the type mentioned above to the extent that the airbag can be activated without a time delay when an associated sensor responds in the event of an accident.

This object is achieved according to the invention by the means for removing the panel or cover being able to be activated separately from the airbag and before the response of a sensor effecting the activation of the airbag. The activation of the means for removing the panel or cover preferably takes place by means of an additional sensor, which responds before the sensor serving for the activation of the airbag. The invention is based on the idea of ensuring, by early removal of the cover or panel, that, at the instant of a response by the sensor serving for the activation of the airbag, the exit opening has already been cleared completely, or at least to a great extent, so that a gas generator of the airbag can be ignited without a time delay and the airbag can leave immediately and unhindered through the already cleared exit opening.

A further advantage of the occupant protection device according to the invention is that the separate activation of the means for removing the panel or cover of the airbag permits a reversible removal of the panel or cover, so that the exit opening can be closed again by the panel if activation of the airbag has not taken place.

A preferred configuration of the invention provides that the sensor effecting the activation of the airbag is an impact sensor which is designed as an acceleration sensor or piezoelectric sensor and only responds if the motor vehicle is in a collision with another object. The sensor effecting the activation of the means for removing the panel or cover is expediently a proximity sensor, which responds already when the motor vehicle approaches another object, to be precise preferably at such an early stage that the panel or cover can be removed completely from the region of the exit opening by the time the impact sensor responds.

The proximity sensor is preferably a contactlessly operating sensor which responds if the distance between the motor vehicle and the other object becomes less than a minimum distance, the minimum distance being dependent on a relative speed between the motor vehicle and the object. In order to prevent a response at low relative speeds, at which in the case of a collision there is not as yet any danger to the occupants, an advantageous configuration of the invention provides that the relative speed must exceed a predetermined limit value before the sensor activates the means for removing the panel or cover.

Contactlessly operating proximity sensors suitable for the intended purpose are known per se and generally comprise a transmitter and a receiver for radar, microwave or ultrasound radiation. The receiver measures the radiation reflected by oncoming motor vehicles, motor vehicles in front which have braked, stationary obstacles or other objects in the way of the motor vehicle, and from this determines the distance. The relative speed is generally measured by using the Doppler effect, as described for example in German reference DE 44 24 878 A1 and the documents cited there.

As an alternative to a contactlessly operating proximity sensor, the sensor effecting the activation of the means for removing the panel or cover may, in principle, also be an impact sensor, which then however must respond before the sensor serving for the activation of the airbag. This can be achieved by a different arrangement and/or response sensitivity of the two sensors, in that, for example, the sensor serving for the activation of the airbag is arranged further away from the point of impact and/or has a lower response sensitivity than the sensor effecting the activation of the means for removing the panel or cover. Impact sensors which are suitable for the activation of the means for removing the panel or cover, and their arrangement, are known in the art and described, for example, the following German references which by reference to them are hereby included in this respect as part of the present application. DE-A 28 14 107 describes a collision protection system for the front of a car, which has a hood pivoted about a front axis and a servo on the rear edge to raise the hood into an inclined position when a sensor at the front of the car senses an obstruction. DE-A 37 04 331 describes a vehicle frontal impact detection system having a component mounted at the front of the vehicle which is deformed upon an impact force above a minimum level. The component is supported at two spaced points on either side of the deformation zone. The relative displacement of these fixing points is used to provide a signal for releasing a safety device for protecting the vehicle occupants. DE-A 42 41 382 teaches a collision sensor which requires inner contact with a flank protector in a door to occur soon after impact on a outer contact. The outer and inner contacts are arranged on either side of the outer panel of the door and are wired to a processing circuit. The outer contact is covered with a soft coating having a locally harder section. The inner contact is set at a predetermined distance from the flank protector. DE-A 42 41 392 teaches a collision sensor which contains bridging pieces between inner and central contacts which ensure contact only after a contact between outer and central contacts. An evaluation circuit is connected to the contacts and generates a three ring signal only when there is a connection between the central and inner contacts within a defined maximum period after the contact between the outer and inner contacts. DE-A 43 00 653 teaches a collision sensor which contains a vehicle wall inductive buckling sensor without direct or indirect time measurement. The sensor contains a device for generating a magnetic field and a conductor whose relative position changes during buckling. Another device amplifiers the electrical voltage induced in the conductor by the associated position change and contains an amplitude discriminator. The magnetic field is produced parallel to and inside an outer vehicle wall by a device mounted on the inner or outer wall skin. The conductor is mounted on one of the skins to undergo relative motion perpendicular to the field during buckling.

The time period required for removing the panel or cover and the time period elapsing between the response of the two sensors are coordinated with each other by corresponding configuration of the sensors and the means for removing the panel or cover, i.e. the earlier the first sensor responds, the more time remains for removal of the panel or cover and the more possible it is to use reversibly operating means which permit the exit opening to be closed again manually or automatically by the panel or cover if the airbag has not been activated.

As a difference from quickly acting means, which are preferably provided with a pyrotechnic propellant charge in order to remove the panel or cover explosively, in the case of means which operate more slowly there may be provided a locking element which secures the spring-biased panel or cover and is unlocked when the first sensor responds, so that the panel or cover is ejected when the spring is relieved, it being able to be refitted if the airbag is not activated.

Another preferred means for removing the panel or cover may comprise an actuation element, which can be driven by motor, pneumatically or hydraulically, acts on the panel or cover and the direction of movement of which is preferably reversible, so that the exit opening can be automatically closed again by the panel or cover if the airbag is not activated.

BRIEF DESCRIPTION OF THE DRAWINGS

The invention is explained in more detail below with reference to two exemplary embodiments represented in the drawing, in which.

DETAILED DESCRIPTION OF THE PREFERRED EMBODIMENTS

Figure 1:
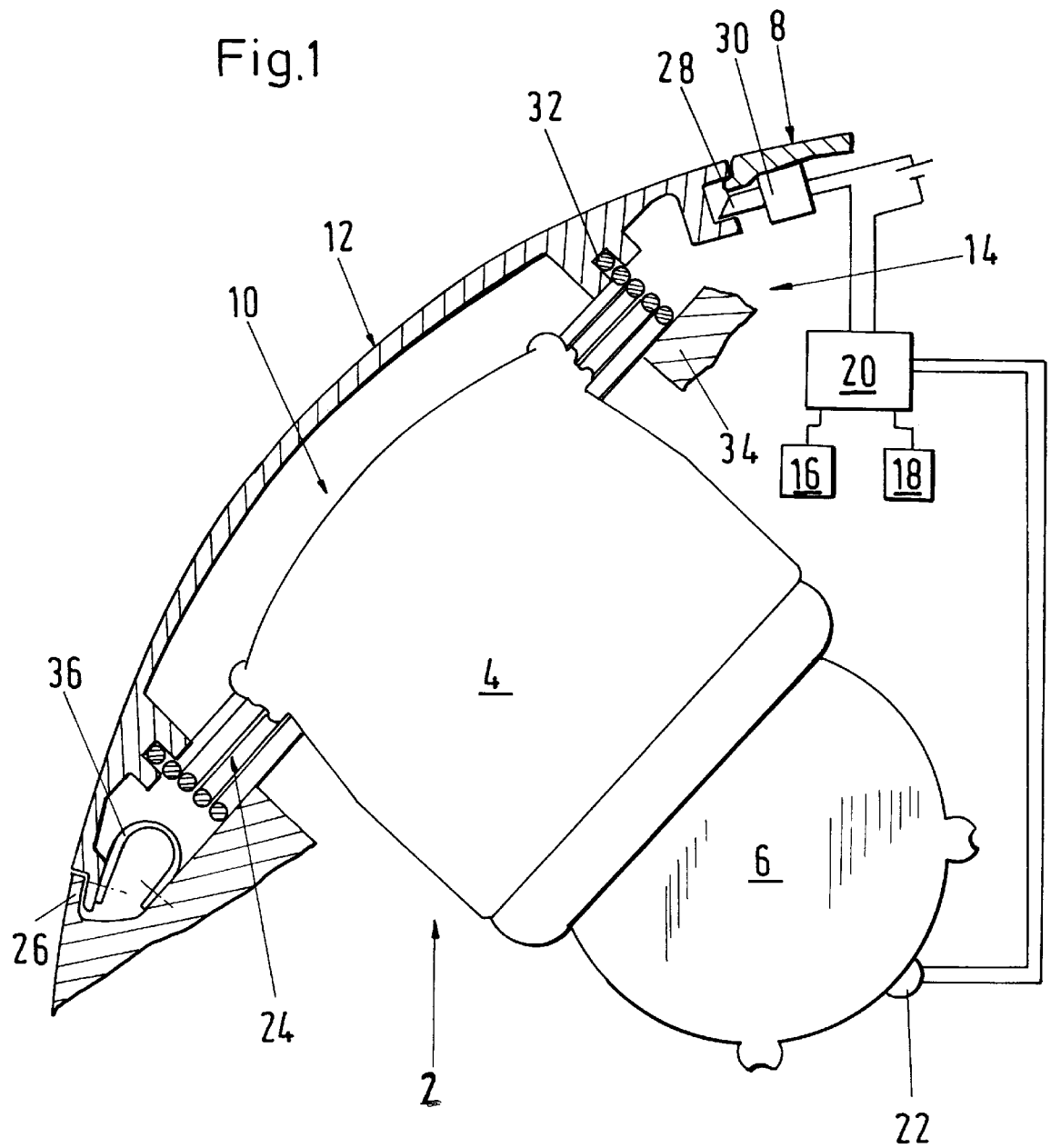
FIG. 1 shows a cross-sectional view of part of an instrument panel with an integrated front-passenger airbag in the case of an occupant protection device according to the invention.

The part represented in the drawing of an occupant protection device of a passenger motor vehicle, essentially comprises a front-passenger-side airbag module 2, which comprises a folded-together airbag (not visible), enclosed by an airbag container 4, and a gas generator (likewise not visible). The module contained in a generator housing 6, and is arranged behind an instrument panel 8 which has an exit opening 10 for the airbag that is normally closed by a cover 12.

In order to minimize the time delay before inflation of the airbag, the cover 12 in front of the exit opening 10 is removed before the airbag is activated. To make this possible, the cover 12 is not forced open by the inflating airbag, as in the case of most known systems, but is removed by a means 14 which is independent of the airbag. The cover removal means 14 is activated by a separate sensor system 16, which operates independently of a sensor system 18 provided for the activation of the airbag gas generator. The cover removal means 14 and the airbag gas generator are activated via a controller 20, which is connected to the sensor systems 16, 18 on the one hand and to the cover removal means 14 and an igniting device 22 of the gas generator on the other hand.

In the case of the embodiment represented in FIG. 1, the cover means 14 comprises a spring-biased pressed-together helical compression spring 24, which is arranged behind the cover 12 and forces the cover 12 in the direction of the interior of the motor vehicle. For securing the rigid cover 12, formed from a plastic material, the edge thereof on its lower side engages behind an adjacent edge 26 of the exit opening 10 to form there a pivot bearing about which the cover 12 is pivoted during opening. On the rest of its periphery, the edge of the covering 12 bears against the edge of the exit opening 10 on the side facing the interior of the motor vehicle. The cover 12 is held in its position, against the force exerted by the helical compression spring 24, on its upper side by an actuation element 28 of a magnetic switch 30, which serves as a locking mechanism.

The helical compression spring 24 has one end press fit into a recessed annular groove 32 on the inner side of the cover 12 and its other end supported loosely against a fixed-in-place abutment 34 arranged behind the instrument panel 8, so that the spring 24 and the cover 12 pivot downward upon activation of the magnetic switch 30 and a resultant drawing in of the actuation element 28 to clear the exit opening 10.

Arranged between the lower edge of the cover 12 and the adjacent edge 26 of the exit opening 10 is a strap 36, which prevents the cover 12 from being detached completely from the instrument panel 8 and coming into the vicinity of a front passenger.

Figure 2:
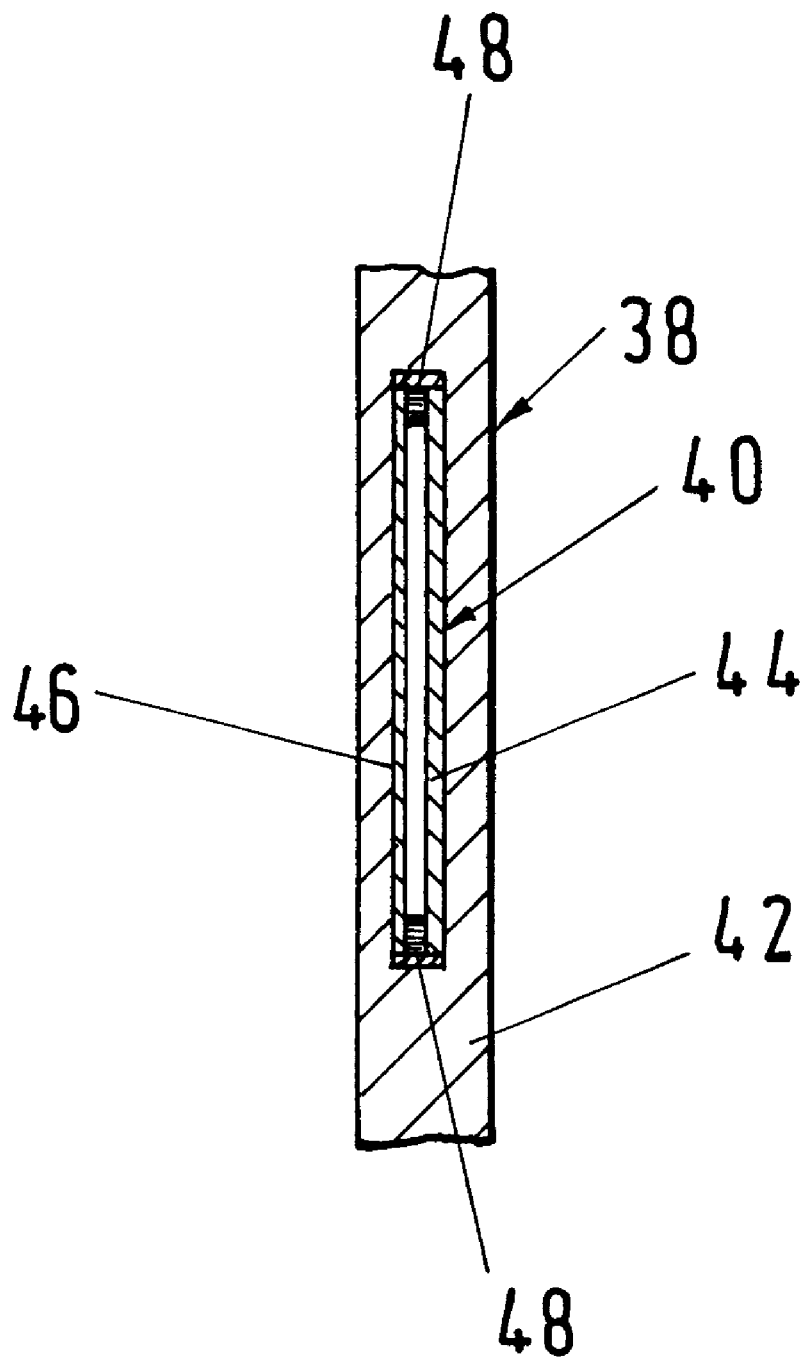
FIG. 2 shows a cross-sectional view of a sensor for activating the means for removing the cover.

While the sensor system 18 for activating the airbag gas generator comprises a conventional accelerator sensor (not shown), which is arranged in the region of the center tunnel of the motor vehicle and responds when the braking acceleration of the motor vehicle during impact with a fixed or moving obstacle exceeds a predetermined value, the sensor system 16 cover removal means 14 comprises, in the case of the embodiment of FIGS. 1 and 2, a sensor 40, arranged in the region of the front bumper 38 of the vehicle. The sensor 40 responds when there is deformation of the bumper 38 and causes the controller 20 to excite a magnetic coil of the magnetic switch 30 and draw in the actuation element 28.

The sensor 40, shown in FIG. 2, comprises two elongate parallel electrical contact strips 44, 46, which are separated by a small distance of, for example, 0.1 to 2 mm by barriers 48 attached at the edges of the strips 44, 46. The two contact strips 44, 46, with the barriers 48, are foamed-in in the vertical front wall 42 of the bumper 38 in the longitudinal direction of the wall, extending over virtually the entire length of the bumper. In the event of impact, the two contact strips 44, 46 touch at one or more points, thereby closing a circuit which is arranged between the controller 20 and the contact strips 44, 46 and is interrupted by the gap between the contact strips 44, 46. Thereupon, the controller 20 activates the magnetic switch 30, which has the consequence of opening the cover 12. This means that the cover 12 is opened not only in the event of serious accidents but also even in the event of accidents where there is slight impact and the like. However, the cover 12 can be refitted quickly and easily, in that its lower edge is hooked behind the neighboring edge 26 of the exit opening 10 and the cover 12 is pressed into the closed position, shown in FIG. 1, while pressing together the helical compression spring 24.

Figure 3:
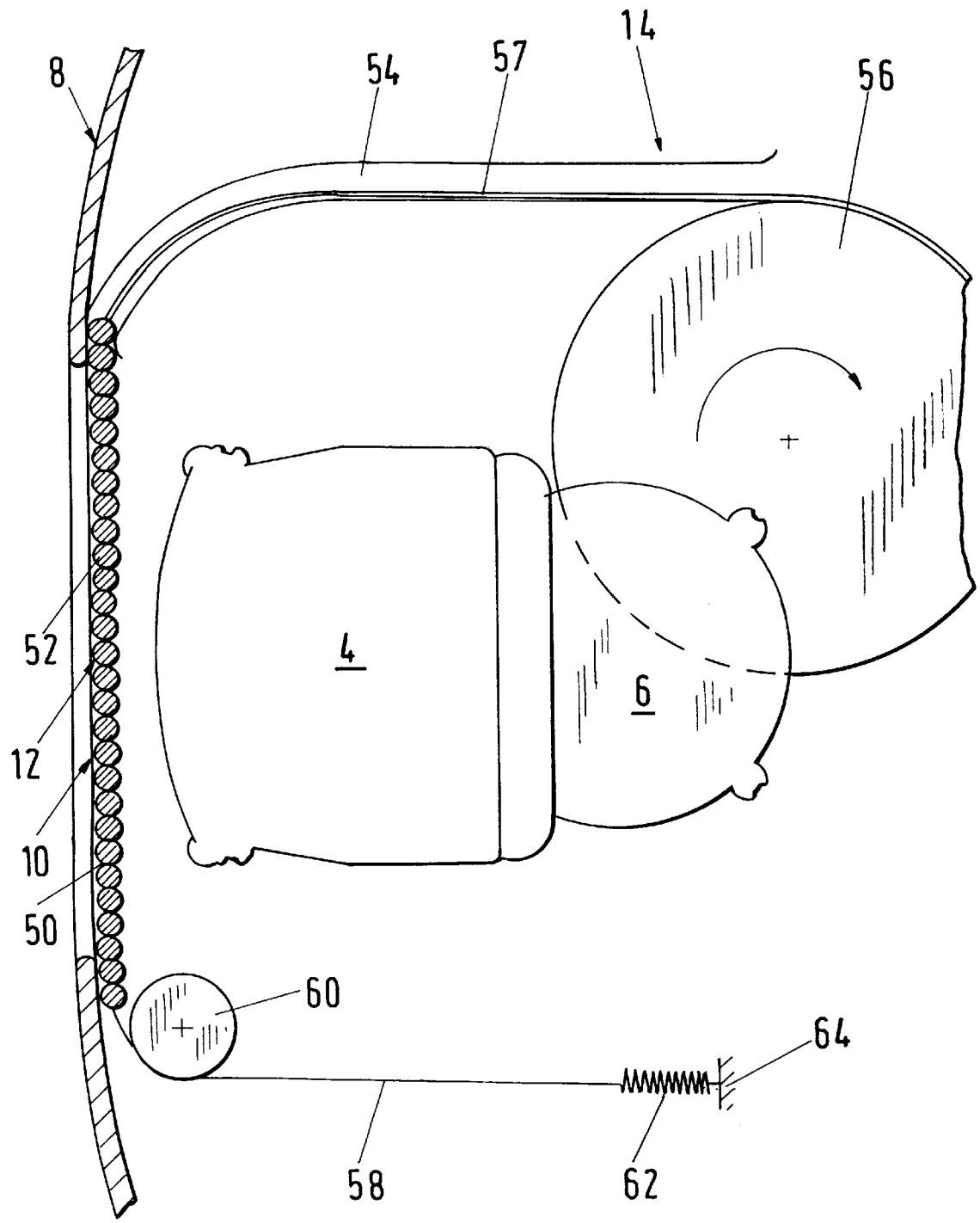
FIG. 3 shows a cross-sectional view of part of a modified occupant protection device, in which the exit opening is automatically closed again if the airbag is not activated.

In another embodiment represented in FIG. 3, the cover 12 is designed as a roller screen 50 which normally closes the exit opening 10'. When the controller 20 receives a predetermined signal from the associated sensor system 16, the screen 50 is opened by an electric motor with a reversible direction of rotation. The roller screen 50 comprises a plurality of parallel plastic slats 52, which are connected to one another in an articulated manner and are pulled upward and clear the exit opening 10 when the electric motor is activated. The opposite extreme ends of the slats 52 are thereby drawn by two arcuate lateral guide rails 54 in the direction of two drive wheels 56, which are arranged at the ends of the guide rails 54 and are connected to the output shaft of the electric motor. Fastened to the uppermost slat 52 are two pulling strips 57, which are wound around the drive wheels 56. Fastened to the lowermost slat 52 are two tensioning strips 58, which run behind the side edge of the exit opening 10 when the latter is open, so that they do not hinder the exiting of the airbag. The tensioning strips 58 are respectively led over a deflection roller 60 and fastened to one end of a tension spring 62. The other end of the spring 62 is hooked onto a fixed-in-place abutment 64 behind the instrument panel 8. The two tension springs 62 are tensioned when the roller screen 50 is opened and pull the roller screen 50 back into the closed position when the direction of rotation of the electric motor is reversed. Such a reversal in the direction of rotation takes place, for example, if after the elapse of a predetermined period of time following the activation of the electric motor no ignition of the airbag gas generator takes place. For this purpose, the controller 20 may include, for example, a timing circuit.

Instead of with the aid of an electric motor, the roller screen 50 may alternatively also be opened by means of a hydraulic or pneumatic cylinder, the cylinder rod of which pulls the roller screen 50 away from in front of the exit opening 10 when it extends or retracts and pushes it in front of the exit opening 10 again when it retracts or extends.

Since the opening of the roller screen 50 requires a little more time, the associated sensor system 16 has a contactlessly operating proximity sensor (not shown), which measures in a proximity zone of about 20 m in front of the vehicle the distance between the vehicle and an obstacle in the path of movement of the motor vehicle and at the same time determines the relative speed of the motor vehicle. Proximity sensors for measuring the distance and the relative speed with the aid of the Doppler known and described, for example, in German reference DT 29 49 183 or U.S. Pat. No. 3,684,309. The controller 20 in this case comprises a microprocessor with memory, in which there are stored minimum distances prescribed for each relative speed and if the distance becomes less have the consequence of activating the electric motor and consequently opening the roller screen 50.

Since the proximity sensor of the sensor system 16 responds significantly before the acceleration sensor of the sensor system 18 serving for the activation of the airbag gas generator, the exit opening 10 has already been completely opened when the controller 20 receives from the sensor system 18 a signal which leads to the activation of the gas generator. The airbag can therefore be inflated without any time delay and leave very quickly through the exit opening 10, cleared by the roller screen 50, into the interior of the motor vehicle.

If no activation of the gas generator of the airbag occurs, because a collision is either avoided or takes place only at a low speed which is below the limit value required for the activation of the airbag, the roller screen 50 is automatically closed again by the controller after the elapse of a preset period of time.

In FIG. 1, to simplify the representation, both sensor systems 16, 18 and the controller 20 are shown behind the instrument panel 8, but in practice they are fitted at the most suitable locations, as described above.

I claim:

1. An occupant protection device for a motor vehicle having an airbag exit opening, comprising: at least one inflatable airbag; gas generator means for inflating the airbag so that the airbag leaves through the exit opening into an interior of the motor vehicle; a cover arranged to close the exit opening; sensor means operatively connected to the gas generator for activating the airbag; and means, independent of the airbag, for removing the cover from the exit opening before the sensor means activates the airbag.

2. An occupant protection device according to claim 1, and further comprising sensor means for activating the cover removal means.

3. An occupant protection device according to claim 1, the sensor means for activating the airbag includes an impact sensor configured to be responsive under predetermined collision conditions of the motor vehicle with another object.

4. An occupant protection device according to claim 3, wherein the impact sensor is one of an acceleration sensor and a piezoelectric sensor.

5. An occupant protection device according to claim 2, wherein the sensor means for activating the cover removal means includes a proximity sensor operative to respond when the motor vehicle approaches another object.

6. An occupant protection device according to claim 5, wherein the proximity sensor is configured to respond if a distance between the motor vehicle and the other object becomes less than a minimum distance dependent on a mutual relative speed.

7. An occupant protection device according to claim 2, wherein the sensor means for activating the cover removal means is arranged in a region of an outer limiting wall of the motor vehicle and responds to deformation of the limiting wall.

8. An occupant protection device according to claim 7, wherein the cover removal means is configured to be activatable when the sensor means for activating the cover removal means senses another object and a predetermined traveling speed of the vehicle is simultaneously exceeded.

9. An occupant protection device according to claim 2, wherein the sensor means for activating the airbag is arranged further away from a potential impact point than the sensor means for activating the cover removal means.

10. An occupant protection device according to claim 1, wherein the cover is configured to be movable toward the interior of the motor vehicle.

11. An occupant protection device according to claim 1, and further comprising spring means for biasing at least part of the cover toward the interior of the vehicle, the cover removal means including at least one locking element configured to hold the cover in a closed position against the spring means.

12. An occupant protection device according to claim 1, wherein the cover removal means includes a motor and an element operatively connected to the motor and the cover so as to act on the cover.

13. An occupant protection device according to claim 1, wherein the cover is configured so as to be remountable in the exit opening when the sensor means for activating the airbag does not activate the airbag.

14. An occupant protection device according to claim 1, wherein the cover removal means is operative to automatically close the exit opening with the cover when the sensor means for activating does not activate the airbag.

15. An occupant protection device according to claim 12, wherein the cover is a roller screen, the cover removal means further including drive wheels operatively connected to the motor, and pull straps attached between a first end of the roller screen and the drive wheels so that rotation of the drive wheels moves the roller screen from the exit opening.

16. An occupant protection device according to claim 15, wherein the cover removal means further includes tensioning means connected to a second end of the roller screen to pull the cover back to the exit opening should the sensor means for activating the airbag not activate the airbag.

17. An occupant protection device according to claim 2, and further comprising control means operatively connected to the cover removal means, the means for activating the cover removal means, the gas generator means and the sensor means for activating the airbag, for coordinating activation of the cover removal means and the gas generator means.

18. An occupant protection device according to claim 2, wherein the sensor means for activating the airbag has a lower response sensitivity than the sensor means for activating the cover removal means.

* * * * *